(12) United States Patent
Arrigoni et al.

(10) Patent No.: US 10,532,649 B2
(45) Date of Patent: Jan. 14, 2020

(54) ELECTRIC MOTOR ASSEMBLY FOR A MOTOR VEHICLE AND BRAKE

(71) Applicant: FRENI BREMBO S.P.A., Curno, Bergamo (IT)

(72) Inventors: Riccardo Arrigoni, Curno (IT); Beniamin Szewczyk, Curno (IT); Andrea Butti, Curno (IT)

(73) Assignee: Freni Brembo, S.p.A., Curno, Bergamo (IT)

( * ) Notice: Subject to any disclaimer, the term of this patent is extended or adjusted under 35 U.S.C. 154(b) by 0 days.

(21) Appl. No.: 15/560,303

(22) PCT Filed: Mar. 11, 2016

(86) PCT No.: PCT/IB2016/051389
§ 371 (c)(1),
(2) Date: Sep. 21, 2017

(87) PCT Pub. No.: WO2016/151427
PCT Pub. Date: Sep. 29, 2016

(65) Prior Publication Data
US 2018/0065469 A1   Mar. 8, 2018

(30) Foreign Application Priority Data

Mar. 23, 2015 (IT) .................. 102015902339893

(51) Int. Cl.
*B60K 7/00* (2006.01)
*B62L 1/00* (2006.01)
(Continued)

(52) U.S. Cl.
CPC ............ *B60K 7/0007* (2013.01); *B62L 1/005* (2013.01); *B62M 7/12* (2013.01); *F16D 65/123* (2013.01);
(Continued)

(58) Field of Classification Search
CPC .......... B60K 7/0007; B60K 2007/0038; B60K 2007/0092
See application file for complete search history.

(56) References Cited

U.S. PATENT DOCUMENTS 7,938,211 B2 * 5/2011 Yoshino ............... B60K 7/0007
                                                    180/65.51
8,556,019 B2 * 10/2013 Kuroki ..................... B60K 6/48
                                                    180/220
(Continued)

FOREIGN PATENT DOCUMENTS

JP     2011073528 A    4/2011
JP     2011152903 A    8/2011
(Continued)

OTHER PUBLICATIONS

European Patent Office, The International Search Report and Written Opinion issued in PCT/IB2016/051389, May 30, 2016, 11 pages, European Patent Office, Rijswijk, Netherlands.

*Primary Examiner* — Katy M Ebner
(74) *Attorney, Agent, or Firm* — Marshall & Melhorn, LLC

(57) ABSTRACT

An electric motor assembly for a motor vehicle and brake has an engine cartridge with a stator connected to an engine casing. The engine cartridge also has a rotor connected to a wheel shaft. The assembly also has a disc of a disc brake connected to the wheel shaft. The assembly also has a disc brake caliper arranged astride the disc and connected to the engine casing.

10 Claims, 7 Drawing Sheets

(51) Int. Cl.
   *B62M 7/12*   (2006.01)
   *F16D 65/12*  (2006.01)
   *F16D 65/02*  (2006.01)

(52) U.S. Cl.
   CPC ............... *B60K 2007/0038* (2013.01); *B60K 2007/0092* (2013.01); *F16D 2065/138* (2013.01); *F16D 2065/1388* (2013.01)

(56) References Cited

U.S. PATENT DOCUMENTS

| | | | |
|---|---|---|---|
| 8,596,394 B2 | 12/2013 | Yoshino et al. | |
| 8,616,314 B2* | 12/2013 | Murata | B60B 25/045 180/65.51 |
| 8,720,623 B1* | 5/2014 | Kim | B60K 17/043 180/65.51 |
| 8,746,384 B2* | 6/2014 | Nakashima | B62M 7/12 180/220 |
| 8,746,392 B2* | 6/2014 | Nomura | B60K 6/48 180/220 |
| 8,813,886 B2 | 8/2014 | Nishikawa et al. | |
| 8,820,448 B2* | 9/2014 | Shiraki | B60K 7/0007 180/65.1 |
| 8,820,449 B2* | 9/2014 | Nakashima | B60K 7/0007 180/220 |
| 9,150,093 B2* | 10/2015 | Shiraki | B60K 7/0007 |
| 9,403,429 B2* | 8/2016 | Baumgartner | B60K 7/0007 |
| 10,047,808 B2* | 8/2018 | Szewczyk | F16D 55/225 |
| 2011/0316322 A1* | 12/2011 | Abiko | B60L 7/14 301/6.5 |
| 2012/0067676 A1* | 3/2012 | Bramscher | B60K 7/0007 188/71.1 |
| 2013/0009451 A1* | 1/2013 | Nishikawa | B62K 11/04 301/6.5 |
| 2015/0298537 A1* | 10/2015 | Duhamel | H02K 5/10 301/6.5 |

FOREIGN PATENT DOCUMENTS

| | | |
|---|---|---|
| KR | 101219059 B1 | 1/2013 |
| KR | 101242268 B1 | 3/2013 |

* cited by examiner

ELECTRIC MOTOR ASSEMBLY FOR A MOTOR VEHICLE AND BRAKE

FIELD OF THE INVENTION

The present invention relates to an electric motor assembly for a motor vehicle and brake.

In particular, the present invention relates to an electric motor assembly for a motor vehicle and brake as defined in the preamble of claim 1.

BACKGROUND ART

It is known that electric scooters or motor vehicles are provided with electric motors accommodated within the wheel.

Due to the arrangement of the electric motor within the wheel, it is often impossible to also arrange the disc of a disc brake connected to the wheel hub and it is just as frequently impossible to arrange the caliper body within the rim of the wheel, a rim which is almost completely or completely occupied by the electric motor.

Accordingly, the actual solutions of a wheel associated with an electric motor assembly and brake are particularly cumbersome, especially in the axial direction or in the direction which is parallel to the rotation axis of the wheel itself.

The connection of the disc brake to the wheel is feasible if the electric motor, which is accommodated in the wheel, has a rotor arranged externally to the stator, for example as described in document KR101219059.

Indeed, here the brake disc may be connected to the rotor, which is arranged keyed onto an axis to which the fork and the suspension of the motor vehicle are connected, the suspension to which the brake caliper is in turn attached.

If instead the use is provided of an electric motor having the rotor arranged inside the stator so as to form an electric motor cartridge which can be easily replaced inside the wheel and is capable of remaining clean of dirt and debris, and is also simple and quick to replace, here it is substantially impossible to also arrange the braking system within the rim.

Thus, the need is strongly felt to position the disc brake in scooter wheels so as to ensure a small size, especially in axial direction.

Indeed, wheel rims with a small diameter are often used on scooters and therefore it is fundamental to leave ample space in axial direction for a motor which, not being able to extend in radial direction, requires increased width to exert the desired torque.

Moreover, the need is strongly felt to make braking systems for a scooter with electric traction which are simple and safe to install, and especially to service.

SOLUTION

It is thus the object of the present invention to devise an electric motor assembly for a motor vehicle and brake capable of meeting the needs mentioned above and of solving the problems of the background art.

These and other objects are achieved by means of an assembly according to claim 1. Certain advantageous embodiments are the object of the dependent claims.

DRAWINGS

Further features and advantages of the electric motor assembly for a motor vehicle and brake according to the invention will appear in the description below of its preferred, non-limiting example embodiments, with reference to the accompanying drawings, in which.

DESCRIPTION OF SOME PREFERRED EMBODIMENTS

Figure 1:
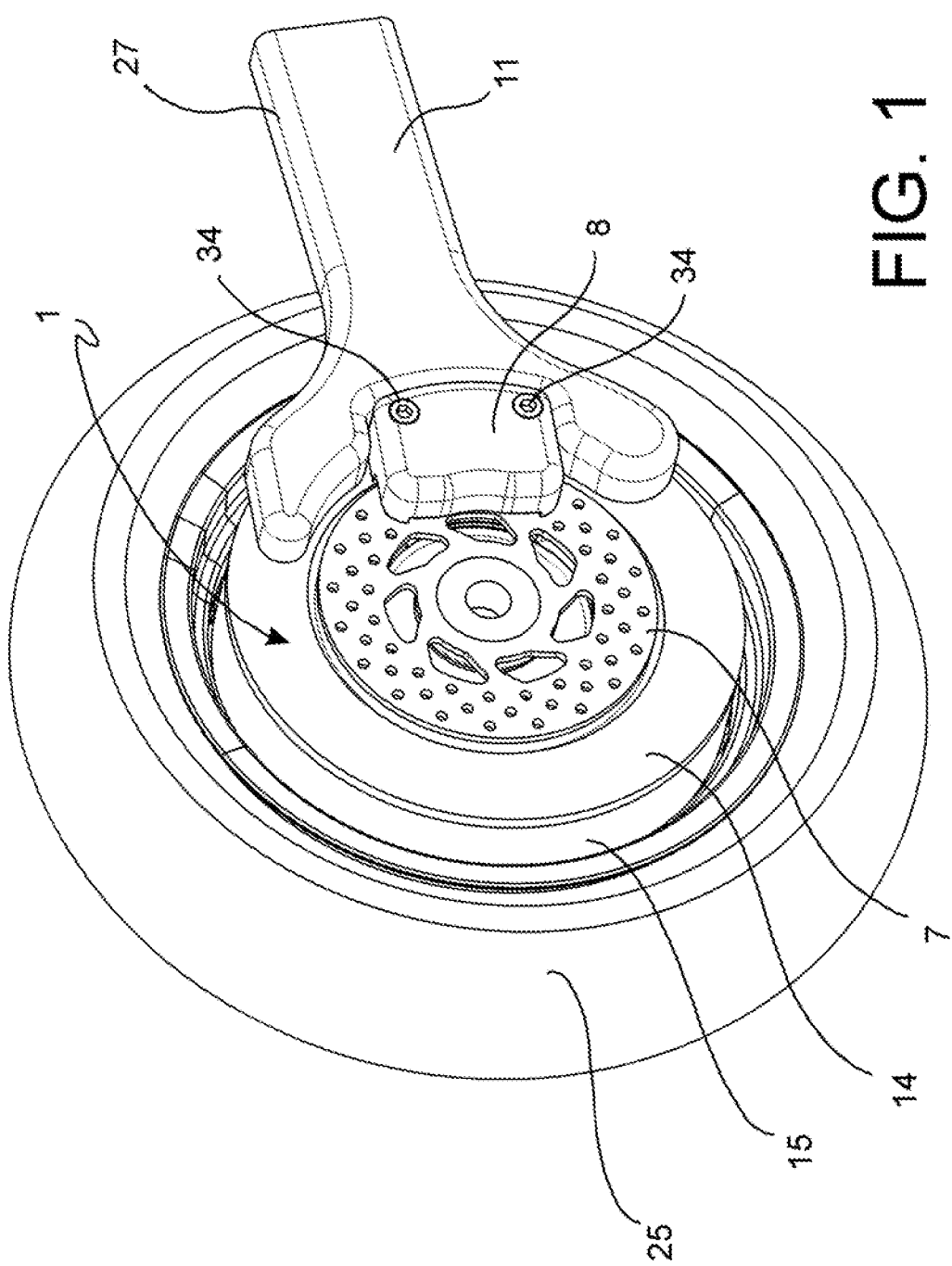
FIG. 1 depicts an axonometric view of a portion of a fork of a scooter or motor vehicle connected to an electric motor fitted within a rim of a wheel.
Figure 2:
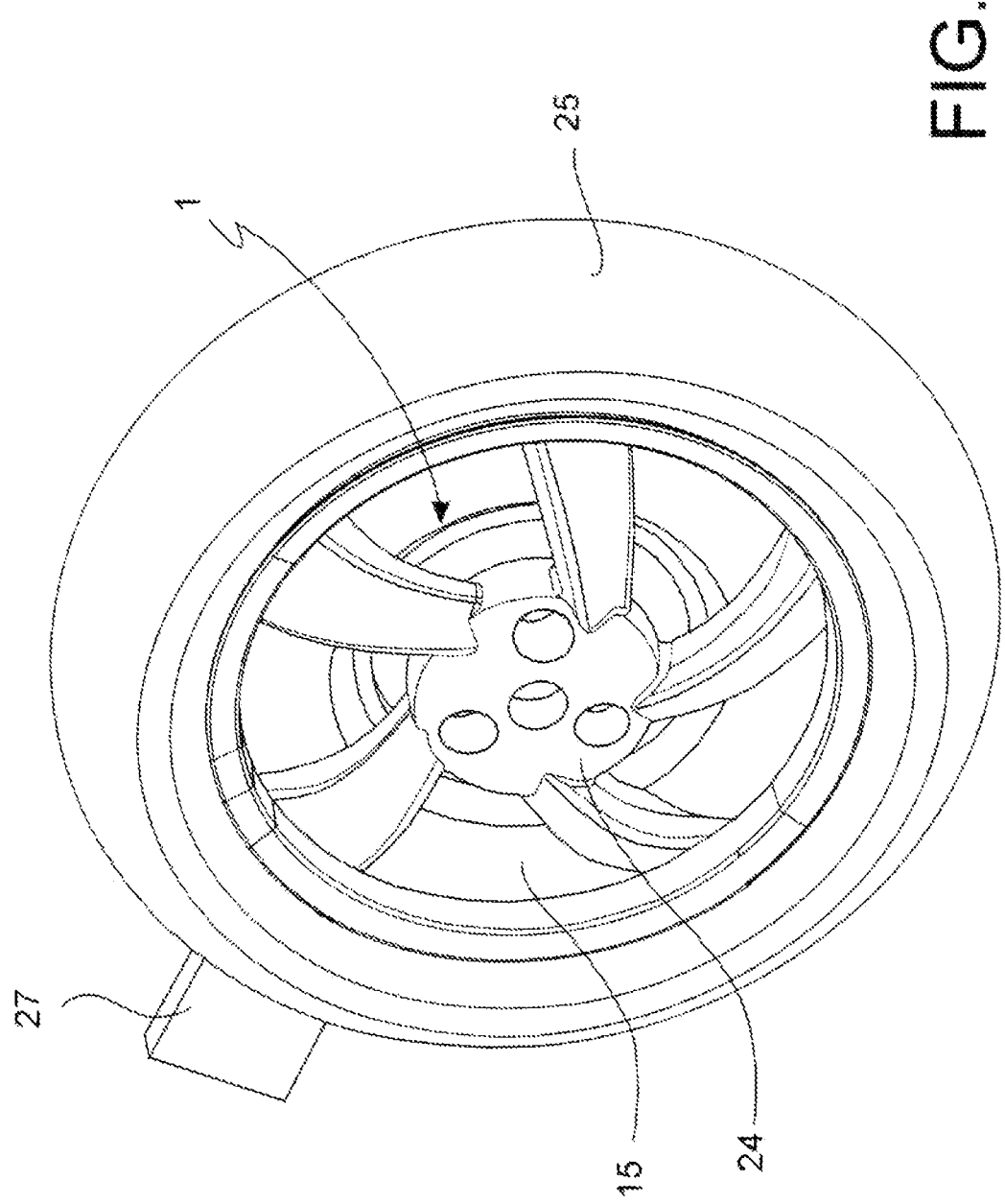
FIG. 2 depicts an axonometric view of the assembly in FIG. 1, and shown from the opposite side of the wheel with respect to the one in FIG. 1.
Figure 3:
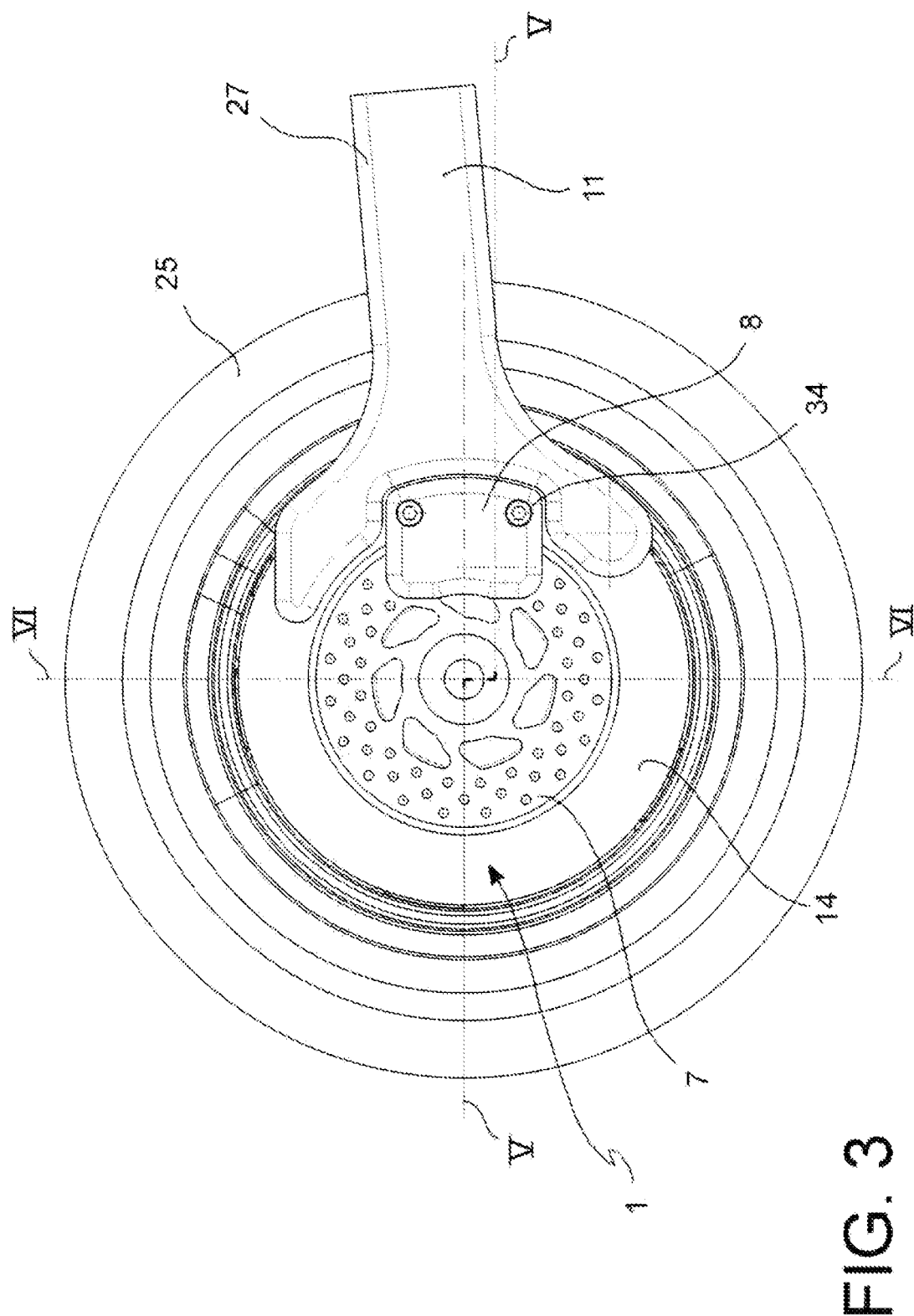
FIG. 3 depicts a front view of the assembly in FIG. 1.
Figure 4:
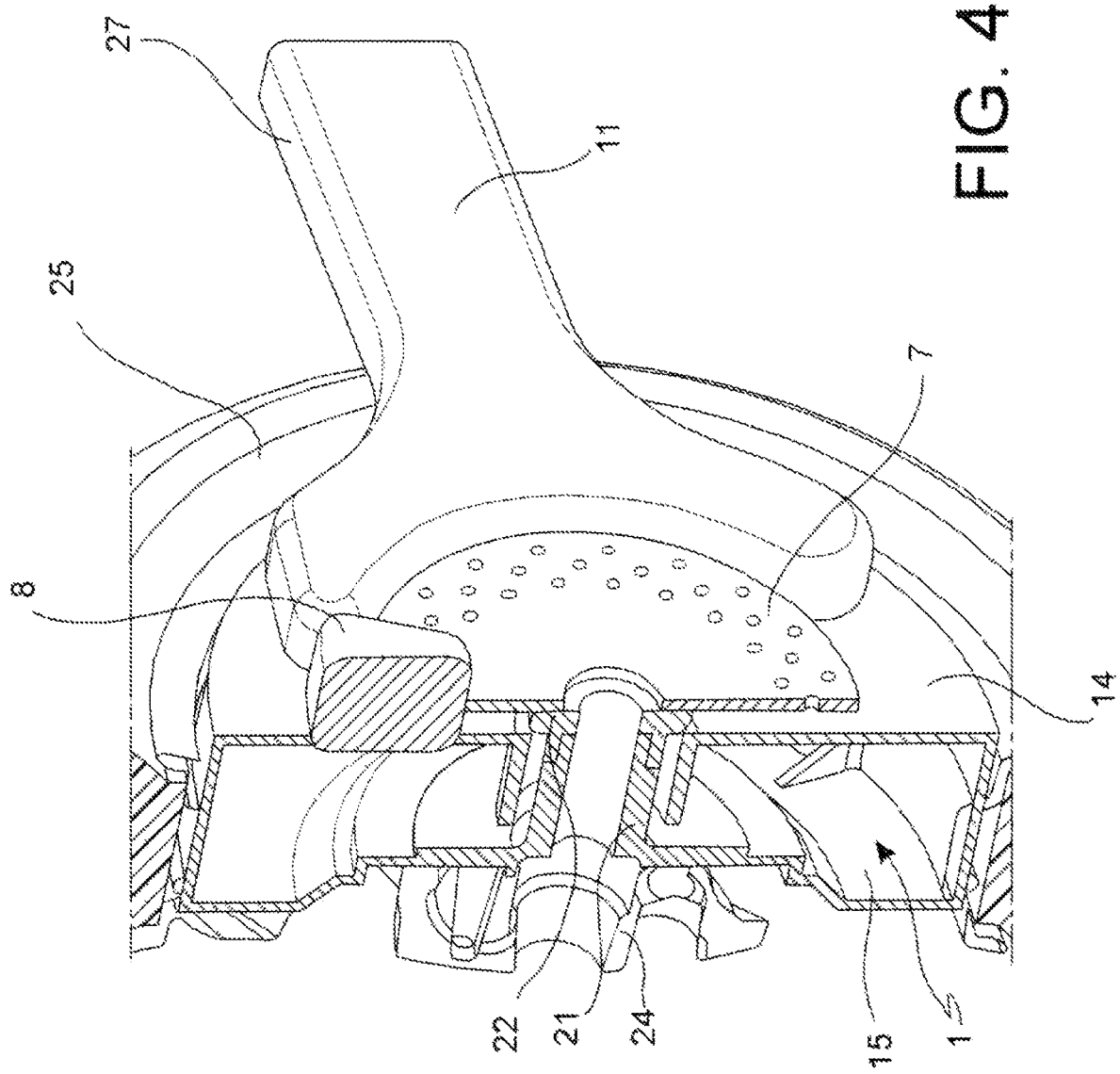
FIG. 4 depicts an axonometric view of a cross section of an assembly fitted within a wheel of a motor vehicle according to a further embodiment.
Figure 5:
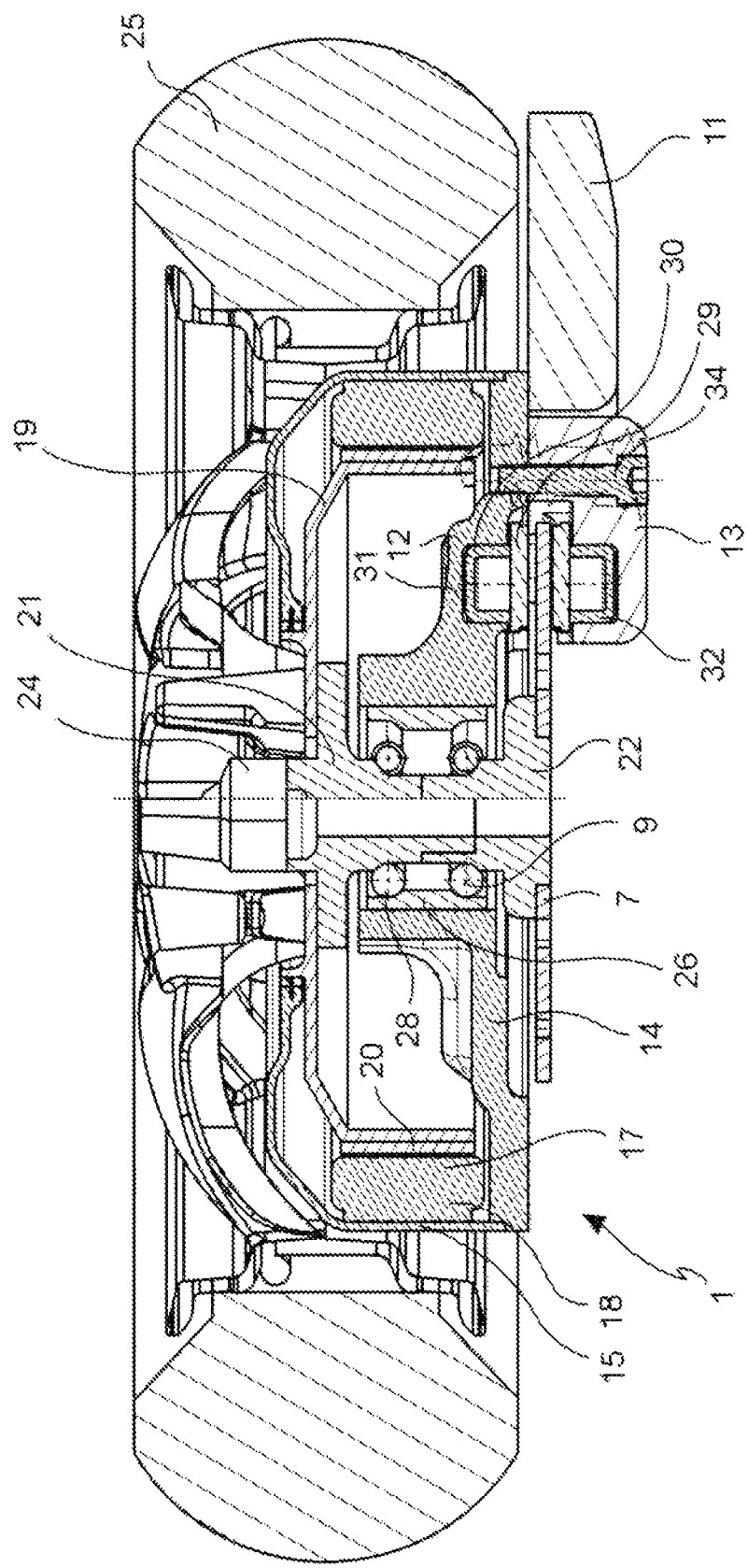
FIG. 5 depicts a cross section of the assembly in FIG. 3, according to line V-V.
Figure 6:
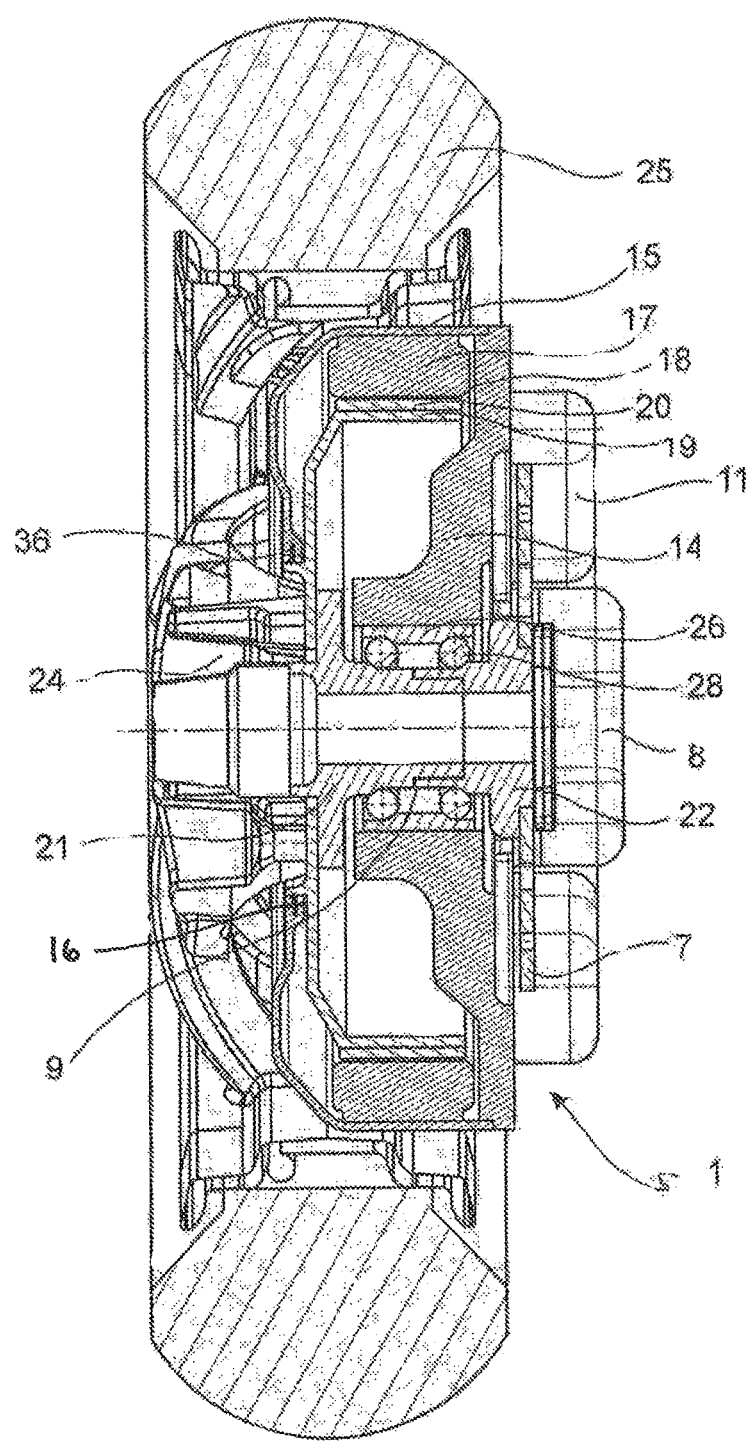
FIG. 6 depicts a cross section of the assembly in FIG. 3, according to line VI-VI.
Figure 7:
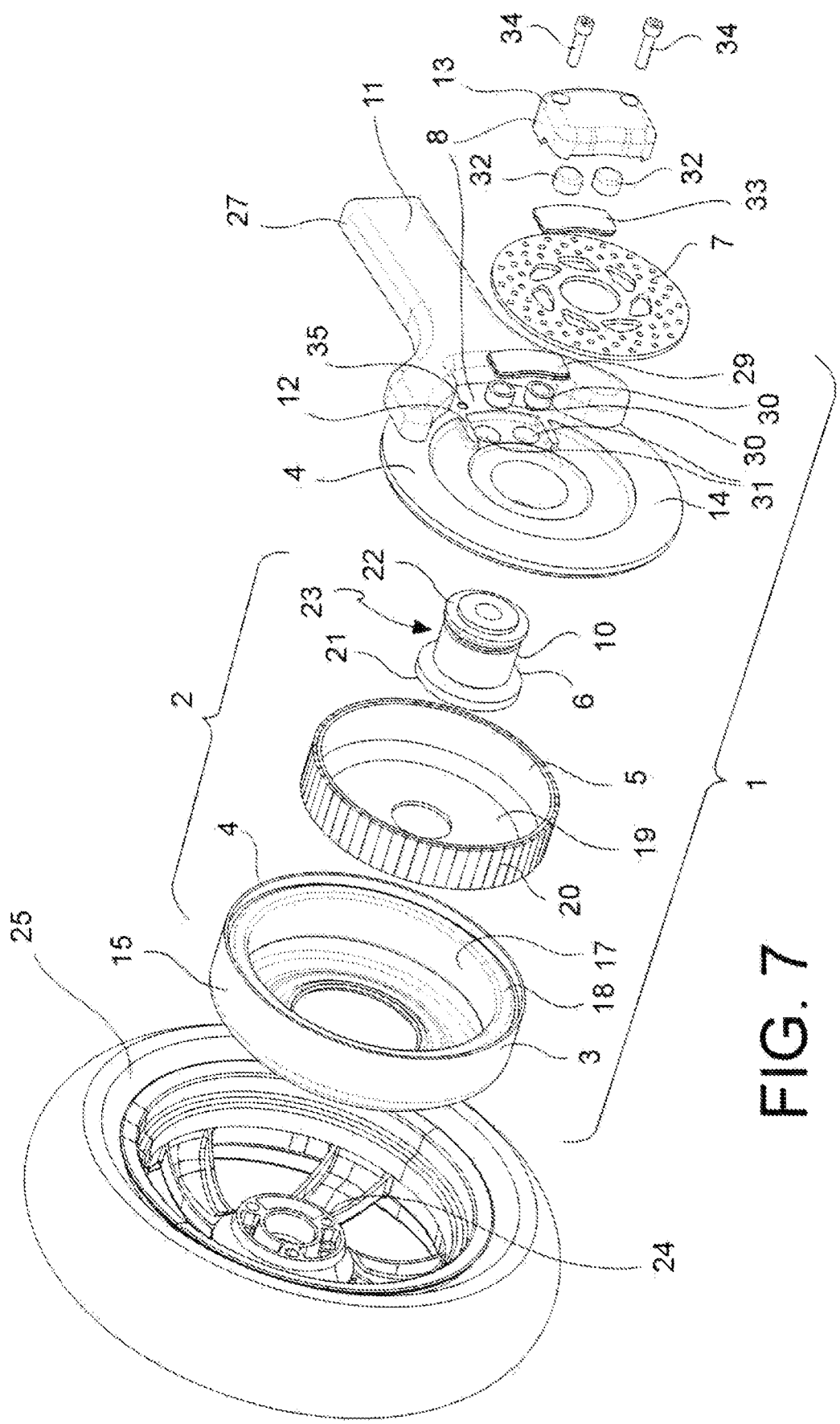
FIG. 7 depicts an exploded axonometric view of the assembly in FIG. 1.

The elements or parts of elements common to the embodiments described below will be indicated using the same numeral.

With reference to the figures, an electric motor assembly 1 for a motor vehicle and brake comprises an engine cartridge 2. Said engine cartridge 2 comprises a stator 3 connected to an engine casing 4. Said engine cartridge 2 further comprises a rotor 5 connected to a wheel shaft 6.

Said assembly 1 further comprises a disc of a disc brake 7 connected to said wheel shaft 6.

Advantageously, said assembly 1 further comprises a disc brake caliper 8 arranged astride said disc 7 and connected to said engine casing 4.

In accordance with one embodiment, said wheel shaft 6 forms an inner bearing fifth wheel 9 (also known as an inner bearing race). In accordance with one embodiment, a bearing 10, in particular rolling bodies of bearing 28 and an external fifth wheel 26 (also known as an outer bearing race), are associated with said inner bearing fifth wheel 9.

In accordance with one embodiment, said engine casing 4 is keyed onto said bearing 10. In accordance with one embodiment, said wheel shaft 6 is supported to rotate about said engine casing 4.

In accordance with one embodiment, said assembly 1 further comprises a fork 11 for a motor vehicle, which fork is firmly attached to said engine casing 4.

In accordance with one embodiment, said assembly 1 further comprises a fork 11 for a motor vehicle made, in accordance with one embodiment, but not necessarily, in one piece or connected to form one piece with said engine casing 4.

In accordance with one embodiment, said assembly 1 comprises a first half-caliper 12, which is firmly connected to, or in one piece with said fork 11.

In accordance with one embodiment, said assembly 1 comprises a first half-caliper 12, which is firmly connected to, or in one piece with, said engine casing 4.

In accordance with one embodiment, said assembly 1 further comprises an associable opposite second half-caliper 13 associated with said first half-caliper 12 so as to arrange said caliper 8 astride the brake disc 7.

In accordance with one embodiment, a first brake pad 29 is arranged between said first half-caliper 12 and said disc 7, said first brake pad 29 for example being affected to exert a braking action by pistons 30 accommodated in piston seats 31 provided in the first half-caliper 12. For example and in accordance with one embodiment, said pistons are two pistons 30.

In accordance with one embodiment, said second half-caliper 13 accommodates the pistons 32 suitable for braking a second brake pad 33 facing said disc brake disc 7 in piston seats. For example and in accordance with one embodiment, said pistons are two pistons 32.

In accordance with one embodiment, said second half-caliper 13 is attached to said first half-caliper 12 by means of stud bolts 34, which are firmly connected to threaded seats 35 provided in the body of the first half-caliper 12.

In accordance with one embodiment, said first half-caliper 12 is made in one piece with said engine casing 4 or said first-half-caliper 12 is alternatively made in one piece with said fork 11.

In accordance with one embodiment, said engine casing 4 comprises a support plate 14 keyed onto said bearing 10. In accordance with one embodiment, said engine casing 4 further comprises a stator housing 15 attached circumferentially to said support plate 14.

In accordance with one embodiment, said stator housing 15 comprises stator windings 17 and stator laminations 18 arranged circumferentially on it and suitable for facing rotor 5.

In accordance with one embodiment, said rotor 5 comprises a rotor sealing flange 16. In accordance with one embodiment, said stator housing 15 faces and is sealed to said rotor sealing flange 16 so as to provide an engine casing 4 which is substantially sealing with respect to the external ambient so as to limit the introduction of dust or debris into motor 2.

Thereby, said motor, with the engine casing 4 and rotor 5 thereof, forms an engine cartridge 2 which can be interchanged without the need to disassemble rotor 5 and stator 3.

In accordance with one embodiment, said rotor 5 comprises a rotor ring 19 with which permanent magnets 20 are associated, which are arranged facing said stator windings 17 and stator laminations 18.

In accordance with one embodiment, said rotor ring 19 is attached to said wheel shaft 6.

In accordance with one embodiment, said wheel shaft 6 comprises a first wheel flange 21 to which said rotor ring 19 is attached, and a facing second rotor flange 22 to which said disc brake disc 7 is connected.

In accordance with one embodiment, said assembly 1 further comprises a bearing cartridge 23. In accordance with one embodiment, said bearing cartridge 23 comprises an inner fifth wheel 9 comprising a first wheel flange 21 to which said rotor ring 19 is attached, said wheel flange 21 being suitable for being attached to a hub 24 of a wheel of a motor vehicle 25. In accordance with one embodiment, said inner fifth wheel 9 comprises a second wheel flange 22 to which said disc brake disc 7 is connected.

In accordance with one embodiment, said bearing cartridge 23 comprises an external fifth wheel 26 onto which said support plate 14 is keyed.

In accordance with one embodiment, said engine casing 4 comprises a support plate 14 to which a lid-shaped stator housing 15 is connected and thereby supported, sealing so as to close casing 4 on a rotor sealing flange 16.

In accordance with one embodiment, said engine casing 4 supports said disc brake caliper 8. In accordance with one embodiment, said engine casing 4 is connected to a fork 11.

In accordance with one embodiment, said engine casing 4 is keyed onto a bearing 10 arranged on said wheel shaft 6.

In accordance with one embodiment, said engine cartridge 2 is connected to a motor vehicle wheel 25 of a motor vehicle 27 by means of an inner bearing fifth wheel 9 made on said wheel shaft 6.

Due to the solutions described above, the axial volume may be reduced and, in addition to positioning an electric motor within a rim of a wheel, a caliper disc assembly and an arm of the suspension of the motor vehicle may be positioned axially side-by-side.

Moreover, due to the solutions described above, the disc brake caliper may be integrated with the casing of the electric motor or the stator of the electric motor.

Due to the solutions described above, the maintenance of the braking system may be facilitated, it being possible to disassemble the caliper, in particular the half-caliper, and then the disc without the need to disassemble the electric motor.

Those skilled in the art may make several changes and adaptations to the above-described embodiments, and replace elements with others which are functionally-equivalent in order to meet contingent needs and specifications, without departing from the scope of the following claims.

For example, in accordance with one embodiment, a caliper having pistons on one side alone and arranged astride a disc floating in axial direction may be provided alternatively to a fixed caliper with opposed pistons acting to have a braking effect on opposite pads against braking surfaces of a brake disc fixed in axial direction.

In accordance with an alternative embodiment, a floating caliper may be provided, in which the bracket is connected to or is in one piece with the casing or with the stator of the electric motor, and the caliper is floating and slides relative to the bracket.

In accordance with an alternative embodiment, an electric motor with an external rotor may be provided alternatively to an electric motor with an internal motor.

In accordance with an alternative embodiment, the disc brake disc 7 is arranged between said fork 11 for a motor vehicle and said engine cartridge 2.

LIST OF REFERENCES

1 electric motor assembly for a motor vehicle and brake
2 engine cartridge
3 stator
4 engine casing
5 rotor
6 wheel shaft
7 disc brake disc
8 disc brake caliper
9 inner bearing fifth wheel
10 bearing
11 fork for motor vehicle
12 first half-caliper
13 associable opposite second half-caliper
14 support plate
15 stator housing
16 rotor sealing flange
17 stator windings
18 stator laminations
19 rotor ring
20 permanent magnets
21 first wheel flange
22 second wheel flange
23 bearing cartridge 24 hub
25 wheel
26 external fifth wheel
27 motor vehicle
28 rolling bodies of bearing
29 first brake pad
30 pistons
31 piston seats
32 pistons
33 second brake pad
34 stud bolts
35 threaded seats
36 sealing gasket between rotor and stator

The invention claimed is:

1. An electric motor assembly for a motor vehicle and brake comprising:
   an engine cartridge comprising a stator connected to an engine casing;
   said engine cartridge further comprising a rotor connected to a wheel shaft;
   said assembly further comprising a disc of a brake disc connected to said wheel shaft;
   wherein said assembly further comprises a disc brake caliper positioned astride said disc and connected to said engine casing;
   said assembly comprises a fork in one piece with said engine casing;
   said wheel shaft forms an inner bearing race; and
   said inner bearing race is joined to a wheel bearing; and
   said engine casing is keyed onto said wheel bearing.

2. The assembly according to claim 1, wherein
   said disc brake disc is placed parallel or coplanar with said fork of a motor vehicle and facing said engine cartridge; and
   said disc brake disc is placed between said fork and said engine cartridge.

3. The assembly according to claim 1 wherein:
   the assembly comprises a first half-caliper firmly connected to, or in one piece with said fork or said engine casing;
   said assembly further comprising an associable opposite second half-caliper associated with said first half-caliper so as to place said caliper astride the brake disc.

4. The assembly according to claim 1 wherein:
   said engine casing comprises a support plate keyed on said wheel bearing;
   said engine casing further comprises a stator housing attached circumferentially to said support plate; and
   said stator housing comprises stator windings and stator laminations arranged circumferentially on it.

5. The assembly according to claim 4 wherein:
   said rotor comprises a rotor ring to which permanent magnets are associated facing said stator windings and stator laminations; and
   said rotor ring is attached to said wheel shaft; and
   said wheel shaft comprises a first wheel flange to which said rotor ring and a facing second rotor flange is attached, to which said disc brake disc is connected.

6. The assembly according to claim 5 wherein:
   said assembly comprises a bearing cartridge wherein said bearing cartridge comprises:
      an inner bearing race comprising said first wheel flange to which said rotor ring is connected and suitable to be connected to a hub of a wheel, and
      said inner bearing race comprises a second wheel flange to which said disc brake disc is connected; and
      said bearing cartridge comprises an external bearing race onto which said support plate is keyed.

7. The assembly according to claim 1 wherein:
   said engine casing comprises a support plate to which a stator housing is connected and thereby supported, sealing so as to close the casing on a sealing flange of the rotor; and
   said engine casing supports said disc brake caliper; and
   said engine casing is keyed on a wheel bearing placed on said wheel shaft.

8. The assembly according to claim 1 wherein:
   said engine cartridge is connected to a wheel of a motor vehicle via an inner race bearing made on said wheel shaft.

9. The assembly according to claim 1, wherein said wheel shaft is supported to rotate about said engine casing.

10. The assembly according to claim 1, wherein said rotor comprises a rotor sealing flange and in which said stator housing is facing and sealed to said rotor sealing flange.

* * * * *